(12) United States Patent
Kacher (10) Patent No.: US 8,098,945 B2
(45) Date of Patent: Jan. 17, 2012

(54) METHOD AND SYSTEM FOR BINARIZING AN IMAGE

(75) Inventor: Olga Kacher, Moscow (RU)

(73) Assignee: ABBYY Software Ltd., Nicosia (CY)

( * ) Notice: Subject to any disclaimer, the term of this patent is extended or adjusted under 35 U.S.C. 154(b) by 649 days.

(21) Appl. No.: 12/269,789

(22) Filed: Nov. 12, 2008

(65) Prior Publication Data

US 2010/0119168 A1    May 13, 2010

(51) Int. Cl.
*G06K 9/46* (2006.01)
(52) U.S. Cl. .................. 382/237; 382/173; 382/224
(58) Field of Classification Search .................. 382/237, 382/173, 154, 133, 257, 162, 164, 283, 176, 382/264, 224; 128/922; 378/4; 358/443, 358/451, 3.2, 1.9, 3.28
See application file for complete search history.

(56) References Cited

U.S. PATENT DOCUMENTS

| | | | |
|---|---|---|---|
| 5,850,295 A * | 12/1998 | Uchiyama et al. | 358/443 |
| 6,404,919 B1 * | 6/2002 | Nishigaki et al. | 382/176 |
| 6,731,407 B1 * | 5/2004 | Hayama | 358/3.2 |
| 7,057,595 B1 | 6/2006 | Benyoub et al. | |
| 7,298,897 B1 | 11/2007 | Dominguez et al. | |
| 7,333,656 B2 | 2/2008 | Takarada | |
| 7,801,352 B2 * | 9/2010 | Uchiyama et al. | 382/133 |
| 7,978,898 B2 * | 7/2011 | Uchiyama et al. | 382/133 |

OTHER PUBLICATIONS

Rais et al., "Adaptive Thresholding Technique for Document Images Analysis", IEEE, Sep. 2004, pp. 61-66.*

* cited by examiner

*Primary Examiner* — Anh Hong Do
(74) *Attorney, Agent, or Firm* — John C. Meline (57) ABSTRACT

In one embodiment, the invention provides a method for binarizing an image. The method comprises establishing boundaries of image objects of the image and classifying each image object as either suspect or non-suspect. The method further comprises creating a local binarization threshold map comprising threshold binarization values associated with image objects classified as non-suspect and then expanding the local binarization threshold map to cover the entire image thereby to create a global binarization threshold map for the entire image.

19 Claims, 7 Drawing Sheets

METHOD AND SYSTEM FOR BINARIZING AN IMAGE

FIELD

Embodiments of the present invention relate to Optical Character Recognition (OCR), and particularly to a method and system for binarizing an image.

BACKGROUND OF THE INVENTION

OCR is a technology that enables conversion of images (e.g. scanned or photographed images) of printed text into machine-editable and searchable text. Binarization is an important process which prepares an image for OCR. Better binarization quality results in higher quality of OCR. Each pixel of a binarized image may have only one of two values—black or white.

Pixels of grayscale images are additionally characterized by a number representing brightness, from 0 (black) to 255 (white). In order to binarize a grayscale image, a brightness threshold must be established for each pixel; a pixel with a brightness level above this threshold is considered white and a pixel with a brightness level below this threshold is considered black. A potential difficulty of image binarization lies in establishing the thresholds so that the image is not distorted and no valuable information (i.e. the text to be recognized) is lost.

SUMMARY

Embodiments of the present invention disclose a method for binarizing an image. The method comprises establishing boundaries of image objects of the image and classifying each image object as either suspect or non-suspect. The method further comprises creating a local binarization threshold map comprising threshold binarization values associated with image objects classified as non-suspect and then expanding the local binarization threshold map to cover the entire image thereby to create a global binarization threshold map for the entire image.

The method may then comprise creating a binarized image based on the global binarization threshold map and applying an OCR algorithm to the binarized image. Embodiments of the invention also cover a system for implementing said method.

In other words, the present invention provides for binarizing an image by creating a binarization threshold map. The map is composed of the threshold values for each pixel on the source image and is created in several stages. First, the boundaries of all the image objects (i.e. text, tables, full stops, separators, solid areas, etc.) are established based on the information about the objects' contrast values. Next, the map is created locally around non-suspect objects. Finally, the map is expanded and interpolated to cover the entire image.

BRIEF DESCRIPTION OF THE DRAWINGS

FIG. 2 shows an image obtained from the image in FIG. 1 by applying the image binarization method in accordance with an example embodiment.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrases "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present invention disclose a method for binarizing an image. The method comprises establishing boundaries of image objects of the image and classifying each image object as either suspect or non-suspect. The method further comprises creating a local binarization threshold map comprising threshold binarization values associated with image objects classified as non-suspect and then expanding the local binarization threshold map to cover the entire image thereby to create a global binarization threshold map for the entire image.

The method may then comprise creating a binarized image based on the global binarization threshold map and applying an OCR algorithm to the binarized image.

Figure 1:
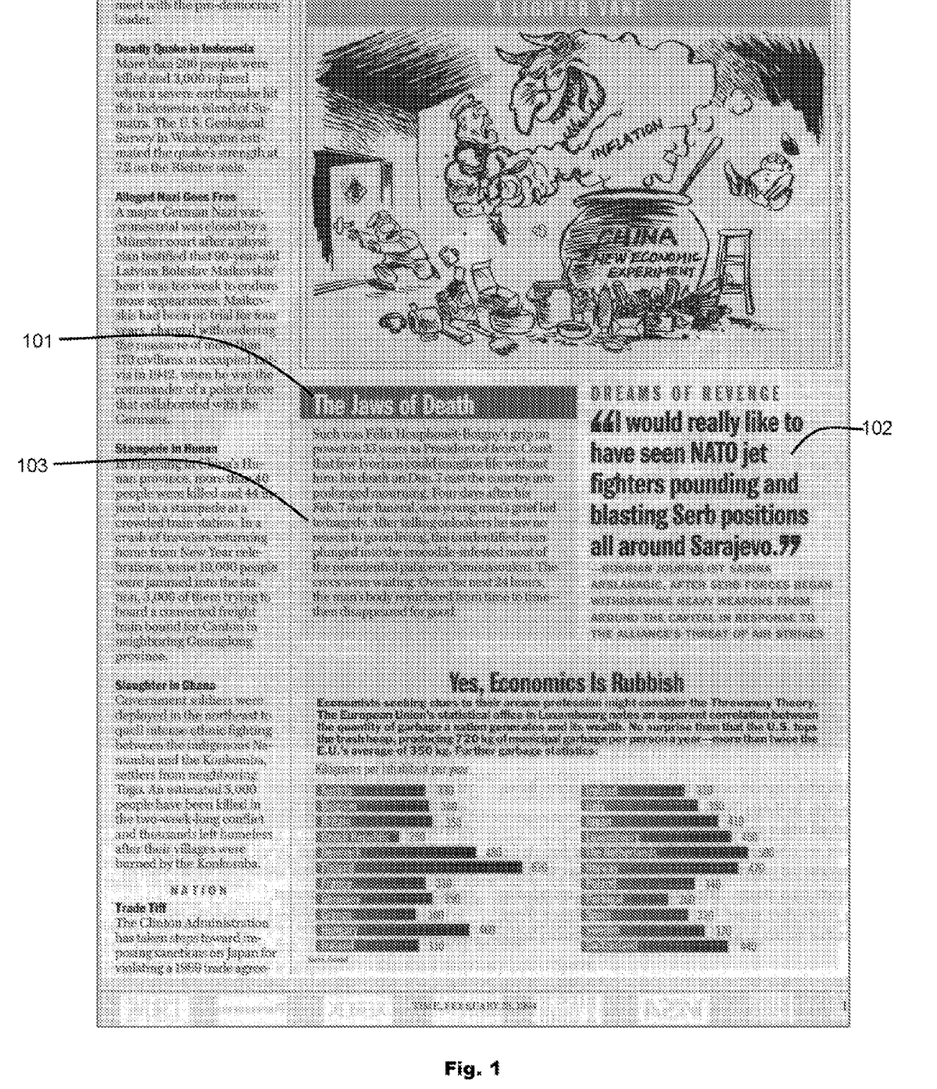
FIG. 1 shows a source image to be binarized.

FIG. 1 shows an example of a source image to be binarized, prior to OCR. FIG. 2 shows a resultant image obtained by applying the method for binarizing an image, in accordance with an example embodiment, to the source image of FIG. 1.

A purpose of pre-OCR binarization is to ensure detection of the maximum number of text objects, in other words, to enhance the effectiveness of the OCR process. With this in mind, a method in accordance with an example embodiment is further described with reference to FIG. 3.

Figure 3:
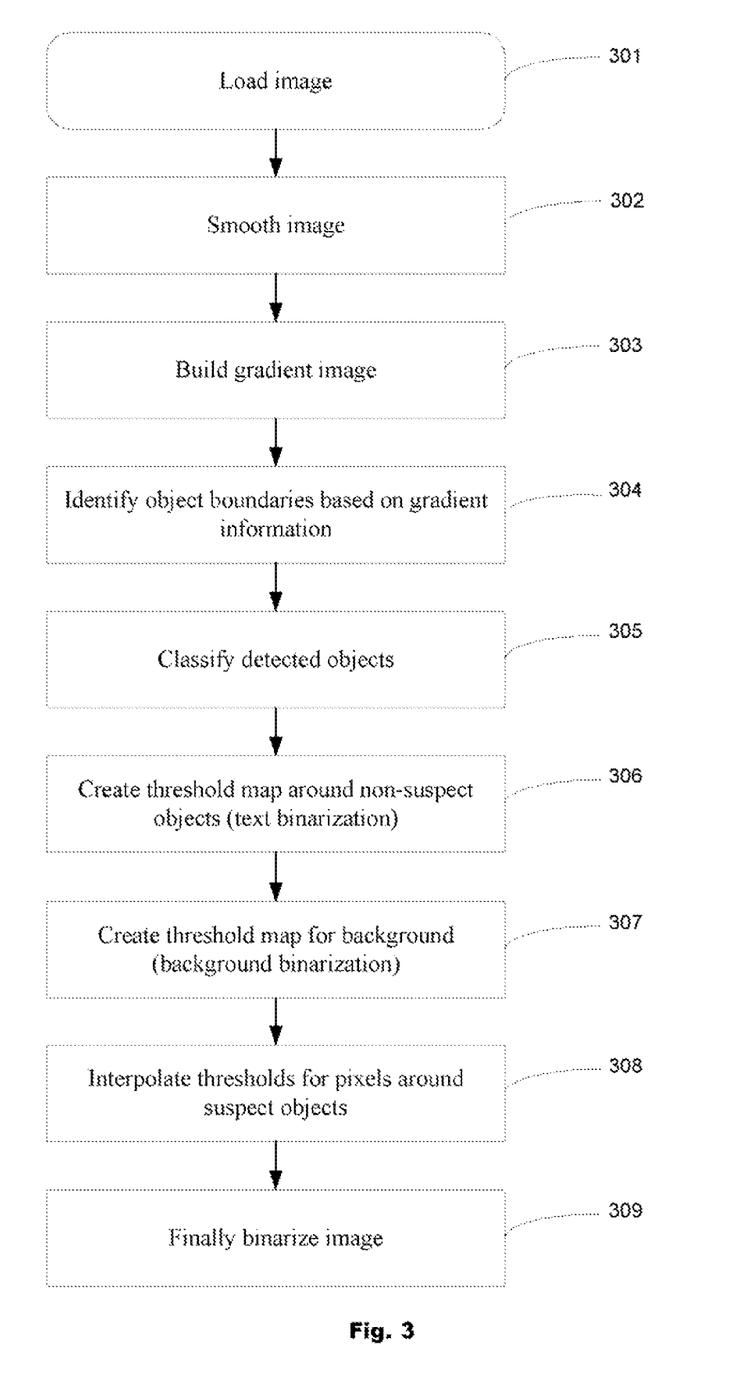
FIG. 3 shows a flowchart of a method of image binarization, in accordance with an example embodiment.

First, an image is loaded or acquired, at block 301 (of FIG. 3). A system 500 (refer further to FIG. 5) for binarizing an image, e.g. a system which implements the method of FIG. 3, may include an input device 506, such as a scanner, for loading the image. Alternatively, a pre-loaded image may be communicated to the system 500, e.g. via a network 512.

Figure 4A:
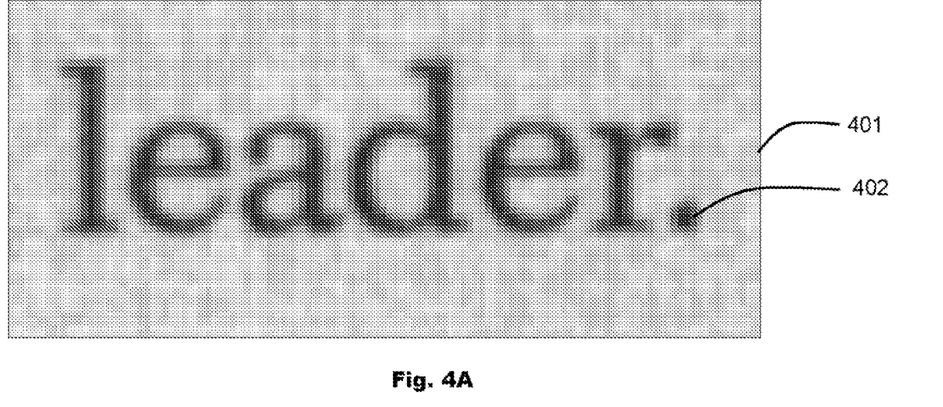
FIG. 4A is an enlargement of a fragment 401 of FIG. 1.
Figure 4B:
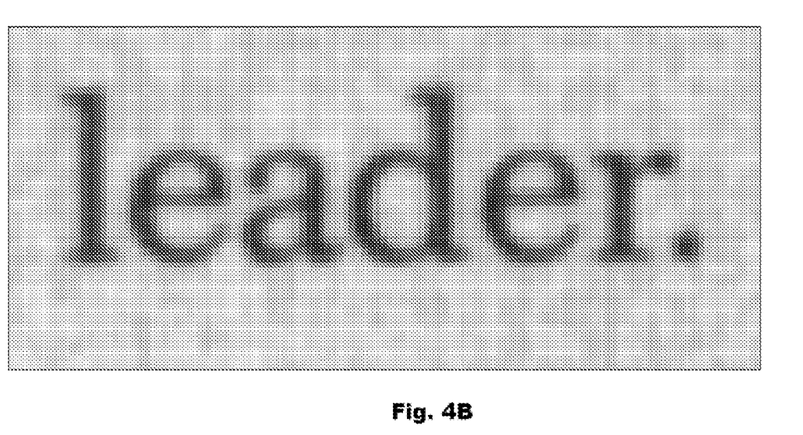
FIG. 4B shows the fragment 401 after smoothing.

A good identifier of a text object is its boundaries; the higher the text contrast, the sharper its boundaries. Thus, object boundaries may be detected by finding the objects with the highest contrast. However, textured areas may pose problems, as textures often have the same contrast as the text. Therefore, prior to detecting the object boundaries, the method may comprise smoothing, at block 302, the image. The smoothing process may smooth the textured areas without blurring the contrast boundaries between meaningful objects. This can be successfully achieved by using, for example, a nonlinear filter. More particularly, FIG. 4A shows an enlarged fragment 401 of the source image shown in FIG. 1, while FIG. 4B shows the same fragment after it has been smoothed.

Figure 4C:
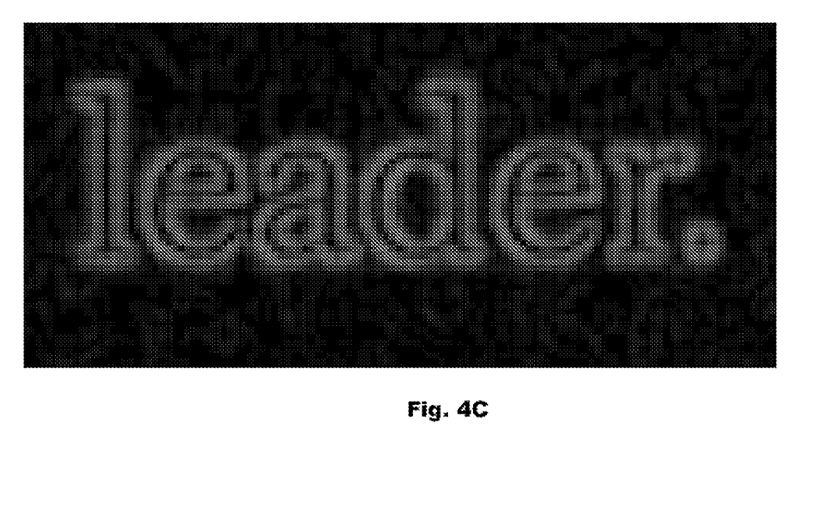
FIG. 4C shows the fragment 401 on a gradient image.

To establish the boundaries of the image objects (further referred to merely as objects), a gradient image is created, at block 303, on which the objects with the highest contrast are identified. The gradient is a function of the brightness of a pixel and is computed based on the pixel's neighboring pixels. To compute the gradient, the Sobel 3×3 operator is used, in this embodiment. The Sobel operator is a discrete differentiation operator, which computes an approximation of the gradient of the image intensity function. FIG. 4C shows a fragment 401 obtained by applying the Sobel operator to the smoothed image of FIG. 4B.

The pixels with sufficiently high values of the gradient are considered as boundaries. Therefore, in accordance with an example embodiment, finding text on an image comprises detecting the boundaries of the image, at block 304. It may be problematic to identify or define the threshold above which the value of the gradient is sufficiently high. In other words, it is necessary to define an appropriate gradient binarization threshold. If the threshold is too low, the boundaries will be identified on textures and small noise, and if it is too high, the boundaries of meaningful objects may not be identified at all. In this example embodiment, a constant number is used as the threshold.

Figure 4D:
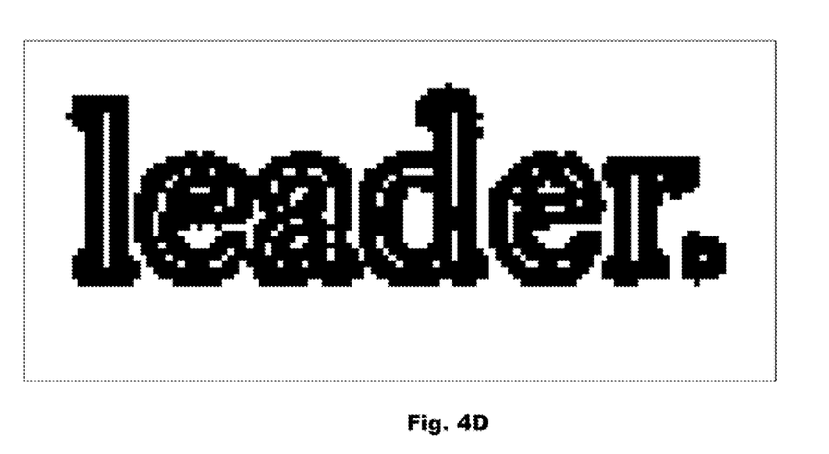
FIG. 4D shows the fragment 401 with the established object boundaries.

For most images, acceptable gradient binarization thresholds lie between 30 and 60. For images without background noise, which may contain low-contrast elements, the threshold may be lower, whereas for images with textured areas, the threshold may be higher. The following technique may be used to determine whether an image belongs to the first or to the second category. The relative number of pixels with low gradient values is determined (in the range from 0 to 5). Such pixels with low gradient values may be plentiful on images without background noise (around 60%) and scarce on images with textured areas (around 20-30%). Based on this criterion, the gradient binarization threshold is selected. FIG. 4D shows the established boundaries of the objects on fragment 401.

Broadly, in accordance with an example embodiment objects on the image are identified (i.e. their boundaries are established), to binarize the local neighborhoods of these objects, and then the thresholds obtained in the local binarization are applied to the entire image, i.e. to create a threshold map. The threshold map is composed of threshold binarization values for each pixel of the source image. Once the threshold map is created, the final binarization is performed by comparing the brightness value of each pixel with the threshold value assigned to it.

Difficulties may arise in the course of local binarization. If, for example, there is a gray solid area with black text 103 on a white page, then the text should be binarized to black and the rest should be binarized to white. However, if the solid area has sufficient contrast, its boundaries may be successfully identified. If these boundaries are binarized locally (i.e. the contrast of each pixel is above the threshold binarization value), they will be binarized to black, and the text on this solid gray area will not be identified. Wrong thresholds like these should not be applied to the neighboring pixels. A similar problem may arise with small-sized noise, table cells, separators, etc.

Therefore, the objects must be classified, at block 305, into suspect and non-suspect. The threshold map is created in the neighborhoods of non-suspect objects and only then is applied to the entire image. Suspect objects include small-sized noise, separators, very large objects, table cells, and small and elongated objects. Text is a non-suspect object.

However, it is very difficult to classify objects globally, as the same object may be suspect in one case and non-suspect in another (e.g. a very large letter is suspect if located next to small-print text, but is not suspect on its own and should be binarized; a solid area which contains text is suspect, but an empty solid area is non-suspect). Therefore, a more complex classification may be used. For each object, a penalty may be specified, depending on the size of the object, the ratio of its sides, presence of other objects inside it, etc.

The following criteria may be used to identify suspect objects:
  The number of pixels in the object (to cut off small objects).
  The area and linear dimensions of the object (to cut off very large objects).
  The number of inside objects (to cut off solid areas and table cells).
  The ratio of the sides of the object (to cut off separators and thin lines).

Objects are best classified locally. For this purpose, the image is segmented into segments, for example squares, for example squares of 64×64 pixels, and for each segment a mean penalty is calculated based on the objects contained inside the segment. The objects with a penalty below this threshold may be considered non-suspect, and all the others may then be considered suspect. If an object is deemed suspect in at least one segment, it may automatically be deemed suspect in all the other segments.

Figure 4E:
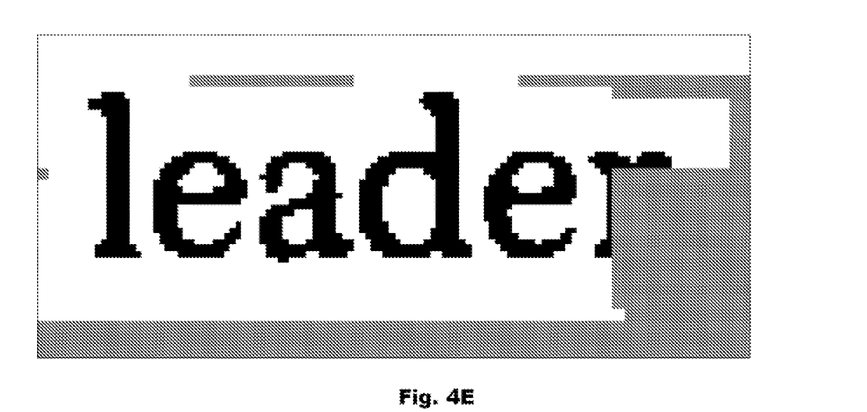
FIG. 4E shows the fragment 401 after text binarization.

Once the objects are classified, the threshold map is created, at block 306, in the neighborhoods of the pixels of non-suspect objects. Small neighborhoods are taken around the non-suspect objects, e.g. squares of 5×5 pixels, and the brightness values of the non-suspect pixels in each of these areas is averaged. Each average value of the neighborhood is the threshold for every pixel within that neighborhood. FIG. 4E shows the binarized text of fragment 401. The pixels which have not yet been binarized are marked in gray.

While binarizing the text, threshold statistics are gathered for subsequent background binarization. The background comprises all pixels outside the object boundaries. Threshold statistics are calculated in squares and a histogram is built. The horizontal axis of the histogram contains the brightness values from 0 to 255, and the vertical axis contains the average values of the binarization thresholds in the given square. The number of pixels that was used to average the thresholds is the weight of a point on the histogram. The greater the weight, the more reliable are the threshold statistics.

Not all the pixels that were binarized in the course of text binarization are used to calculate the background statistics. Only those pixels are used which are located at some distance from the non-suspect pixels. This ensures that statistics are gathered only for the background and not for the text. Often, text and background located in different parts of the image will have close brightness values. For example, text 101 and background 102 in FIG. 1 have similar brightness values. If statistics are gathered only for the text, they may be used to binarize the neighboring background, which will produce the wrong results.

When gathering statistics, it may happen that for the same brightness value, there are different threshold values in the given square (some may be greater than the brightness value, and some may be lower, i.e. some may be designating white and some may be designating black). A decision must be made whether these pixels should be binarized as black or as white. If the thresholds for these pixels are simply averaged, then, when binarizing this square, the pixels with the same brightness value may be considered as either black or white. That is the danger of averaging thresholds of different types for the same brightness value. Therefore, when gathering statistics in each square, two histograms are created first— one contains the thresholds which designate black, and the other contains the thresholds which designate white. Next, a resulting histogram is created, which includes the points with the best statistics (with the greatest weight).

By way of a practical example, statistics may be gathered in a given region of 10 pixels with a brightness value of 100. The average brightness values for these pixels may be as follows: 99, 105, 112, 93, 102, 95, 93, 109, 105, 103. Out of these 10 values, separate average values are calculated from those below 100 and those above 100, and to each is assigned a weight equal to the number of pixels based on which the averaging was performed. Thus, in this example, there are 4 pixels below 100 and 6 pixels above 100. Their average values are 95 with a weight of 4 and 106 with a weight of 6, respectively. These statistics will designate black and white respectively. The value of 106 will be included in the resulting histogram, because it has greater weight (of 6, as opposed to 4). Therefore, all the other pixels in this square which have a brightness value of 100 will be binarized, at block 307, using a threshold of 106.

Next, the statistics gathered when binarizing the background and the text are used to binarize the remaining non-suspect pixels in each square. The pixels surrounding suspect objects may be ignored. If, in one square, there is no threshold for a brightness value, the threshold may be taken from the nearest square. If none of the squares have the necessary threshold, it may be calculated as follows: from several squares nearest to the given square, expanded statistics are gathered, which contain the best points from the statistics of the neighboring squares.

Figure 4F:
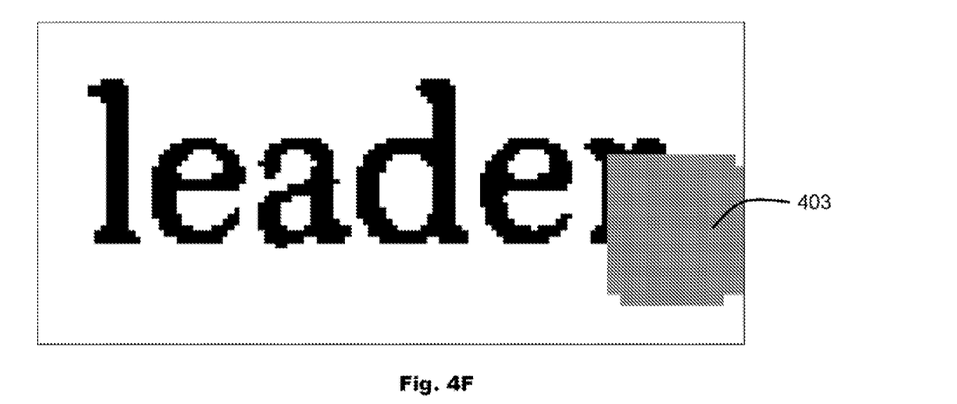
FIG. 4F shows the fragment 401 after background binarization.

FIG. 4F shows the binarized background of the fragment 401. The gray area 403 is the area which has not been binarized, because it surrounds the point 402, considered suspect, as it is a small object and could potentially be noise rather than a full stop at the end of the sentence. Therefore, this area is ignored at this stage.

Once the background is binarized, all the pixels on the threshold map are filled, except those which were deliberately ignored. These pixels are filled using an approximation technique to approximate threshold binarization values for pixels not in any local binarization threshold map, for example using simple linear interpolation in both directions, at block 308. First, they are interpolated horizontally. If this fails, they are interpolated vertically. Once the interpolation is finished, the threshold map becomes completely filled and can be used to binarize, at block 309, the source image.

Figure 4G:
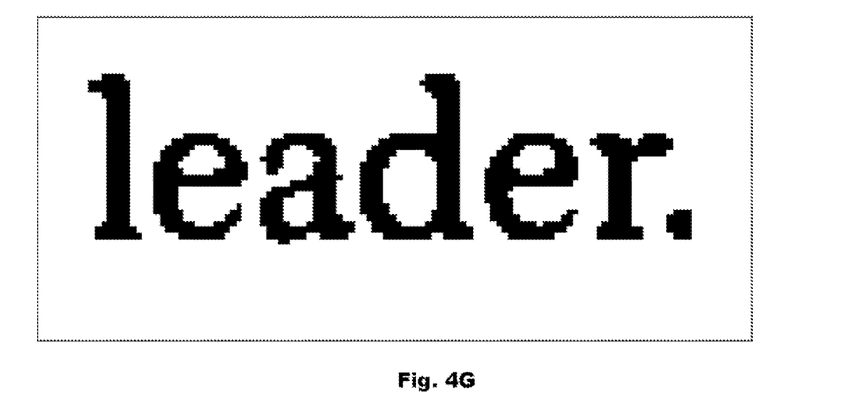
FIG. 4G shows the fragment 401 after final binarization.

FIG. 4G shows the result of the final binarization of fragment 401, and FIG. 2 shows the result of binarizing the entire source image of FIG. 1.

Figure 5:
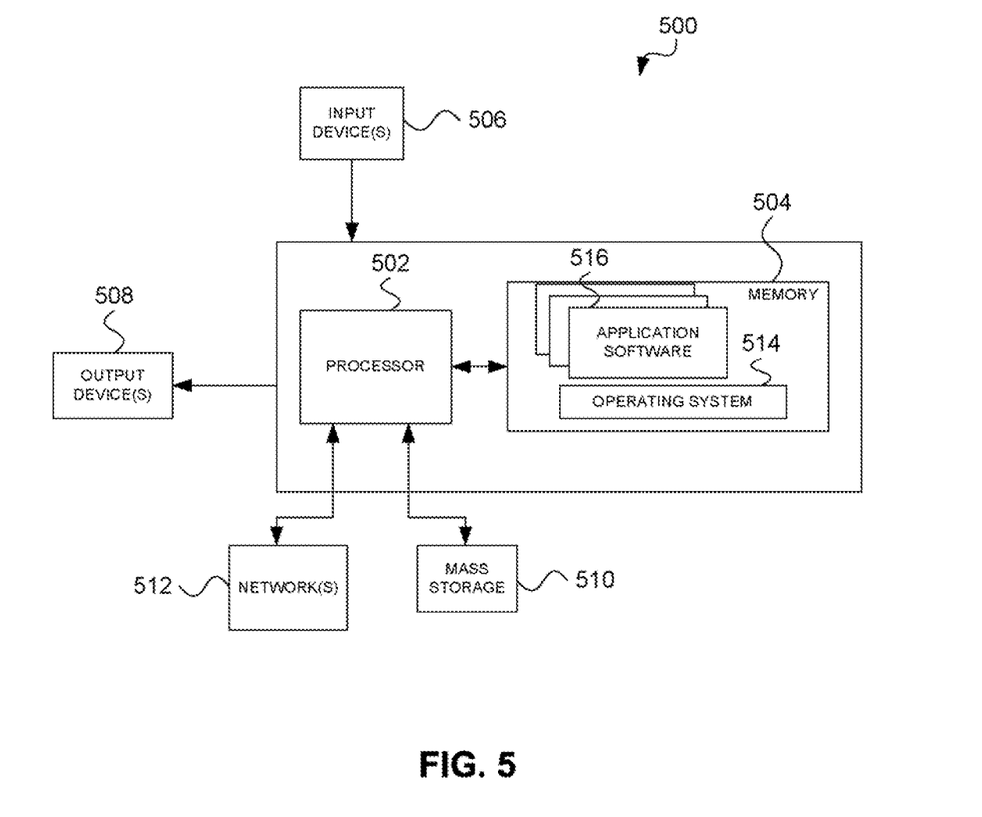
FIG. 5 shows a block diagram of a system for image binarization in accordance with an example embodiment.

FIG. 5 of the drawings shows an example of a system 500. Depending on the use of the system 500, it may be a system for image binarization, optionally including OCR capabilities. The system 500 may be operable to implement the method of FIG. 3. The system 500 may include at least one processor 502 coupled to a memory 504. The processor 502 may represent one or more processors (e.g., microprocessors), and the memory 504 may represent random access memory (RAM) devices comprising a main storage of the system 500, as well as any supplemental levels of memory e.g., cache memories, non-volatile or back-up memories (e.g. programmable or flash memories), read-only memories, etc. In addition, the memory 504 may be considered to include memory storage physically located elsewhere in the system 500, e.g. any cache memory in the processor 502 as well as any storage capacity used as a virtual memory, e.g., as stored on a mass storage device 510.

The system 500 also typically receives a number of inputs and outputs for communicating information externally. For interface with a user or operator, the system 500 may include one or more user input devices 506 (e.g., a keyboard, a mouse, imaging device, etc.) and one or more output devices 508 (e.g., a Liquid Crystal Display (LCD) panel, a sound playback device (speaker, etc)).

For additional storage, the system 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 500 may include an interface with one or more networks 512 (e.g., a local area network (LAN), a wide area network (WAN), a wireless network, and/or the Internet among others) to permit the communication of information with other computers coupled to the networks. It should be appreciated that the system 500 typically includes suitable analog and/or digital interfaces between the processor 502 and each of the components 504, 506, 508, and 512 as is well known in the art.

The system 500 operates under the control of an operating system 514, and executes various computer software applications, components, programs, objects, modules, etc. to implement the techniques described above. Moreover, various applications, components, programs, objects, etc., collectively indicated by reference 516 in FIG. 5, may also execute on one or more processors in another computer coupled to the system 500 via a network 512, e.g. in a distributed computing environment, whereby the processing required to implement the functions of a computer program may be allocated to multiple computers over a network. The application software 516 may include a set of instructions which, when executed by the processor 502, causes the system 500 to implement the method 200 or the method 300.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific example embodiments, it will be evident that various modifications and changes can be made to these embodiments without departing from the broader spirit of the invention. Accordingly, the specification and drawings are to be regarded in an illustrative sense rather than in a restrictive sense.

The invention claimed is:

1. A method for binarizing an image, the method comprising:
   acquiring a copy of the image in an electronic memory in an input device;
   establishing boundaries of image objects of the image based on contrast values for the image objects;
   classifying each image object as either suspect or non-suspect;
   creating a local binarization threshold map, the local binarization threshold map comprising threshold binarization values associated with image objects classified as non-suspect; and
   creating a global binarization threshold map for the entire image by expanding the local binarization threshold map to cover the entire image.

2. The method of claim 1, the method further comprising: creating a binarized image based on the global binarization threshold map.

3. The method of claim 2, the method further comprising: applying an optical character recognition (OCR) algorithm to the binarized image.

4. The method of claim 1, wherein establishing the boundaries of the image objects is based on contrast values for the image objects.

5. The method of claim 1, further comprising smoothing the image prior to establishing the boundaries.

6. The method of claim 1, wherein classifying an image object comprises specifying a penalty and classifying the image object as suspect when it exceeds the penalty and as non-suspect when it does not exceed the penalty.

7. The method of claim 6, wherein the penalty comprises a criterion selected from the group consisting of a number of pixels for the image object, an area and linear dimensions of the image object, a number of inside objects, and a ratio of the sides of the image object.

8. The method of claim 6, wherein the classifying is performed locally based on segments of the image and a mean penalty for each segment.

9. The method of claim 8, wherein the classifying comprises deeming an image object suspect in all segments when the object is suspect in at least one segment.

10. The method of claim 1, wherein expanding the local binarization threshold map is based on an approximation technique to approximate threshold binarization values for pixels not in any local binarization threshold map.

11. A computer-readable medium embodying a set of instructions which, when executed by a computer, causes the computer to perform a method for binarizing an image which method comprises:
    acquiring a copy of the image in an electronic memory of the computer;
    establishing boundaries of image objects of the image;
    classifying each image object as either suspect or non-suspect;
    creating a local binarization threshold map comprising threshold binarization values associated with image objects classified as non-suspect; and
    expanding the local binarization threshold map to cover the entire image thereby
    creating a global binarization threshold map for the entire image.

12. The computer-readable medium of claim 11, the instructions further being operable to create a binarized image based on the global binarization threshold map.

13. The computer-readable medium of claim 12, the instructions further comprising an optical character recognition (OCR) algorithm operable to be applied to the binarized image.

14. The computer-readable medium of claim 11, wherein establishing the boundaries of the image objects is based on contrast values for the image objects.

15. The computer-readable medium of claim 11, further being operable to smooth the image prior to establishing the boundaries.

16. The computer-readable medium of claim 11 wherein classifying an image object comprises specifying a penalty and classifying the image object as suspect when the image object exceeds the penalty and as non-suspect when the image object does not exceed the penalty.

17. The computer-readable medium of claim 11 wherein expanding the local binarization threshold map is based on an approximation technique to approximate threshold binarization values for pixels not in any of local binarization threshold map.

18. A system for binarizing an image comprising:
    a processor; and
    a memory coupled to the processor, the memory storing instructions which when executed by the processor cause the system to perform a method for binarizing an image, the method comprising:
    establishing boundaries of image objects of the image based at least in part on contrast values for the image objects;
    classifying each image object as either suspect or non-suspect;
    creating a local binarization threshold map comprising threshold binarization values associated with image objects classified as non-suspect; and
    expanding the local binarization threshold map to cover the entire image thereby creating a global binarization threshold map.

19. The system of claim 18, wherein classifying an image object comprises specifying a penalty and classifying the image object as suspect when the image object exceeds the penalty and as non-suspect when the image object does not exceed the penalty.

* * * * *